US008392303B2

(12) United States Patent
Desai et al.

(10) Patent No.: US 8,392,303 B2
(45) Date of Patent: Mar. 5, 2013

(54) METHOD, SYSTEM AND PROGRAM PRODUCT FOR DETERMINING A VALUE OF AN INDEX

(75) Inventors: Darshan Desai, Pacific Palisades, CA (US); Joseph Ratterman, Bucyrus, KS (US); Joel Nitz, Overland Park, KS (US)

(73) Assignee: Bats Global Markets, Inc., Lenexa, KS (US)

( * ) Notice: Subject to any disclaimer, the term of this patent is extended or adjusted under 35 U.S.C. 154(b) by 127 days.

(21) Appl. No.: 12/887,349

(22) Filed: Sep. 21, 2010

(65) Prior Publication Data

US 2011/0178951 A1 Jul. 21, 2011

Related U.S. Application Data

(60) Provisional application No. 61/245,882, filed on Sep. 25, 2009.

(51) Int. Cl.
*G06Q 40/00* (2012.01)

(52) U.S. Cl. ........................................ 705/35; 705/36 R

(58) Field of Classification Search ............... 705/35–45
See application file for complete search history.

(56) References Cited

U.S. PATENT DOCUMENTS

2010/0070428 A1* 3/2010 Stamer ........................ 705/36 R

OTHER PUBLICATIONS

S&P Dow Jones Indices launches combined high-dividend and low-volatility index in the US Anonymous. Structured Products9. 2 (Nov. 2012): 5.*

* cited by examiner

*Primary Examiner* — Richard C Weisberger
(74) *Attorney, Agent, or Firm* — Foley & Lardner LLP

(57) ABSTRACT

A method and system for determining and sending or posting an electronic value for an index is provided. A list of sectors is obtained. The system then accesses a database storing company information. Eligible securities are selected, assigned to sectors and ranked within each sector. A weight for each eligible security is determined. An amount for the index value of the selected eligible securities based on the weighting is calculated. The index value may be posted or outputted electronically.

17 Claims, 9 Drawing Sheets

METHOD, SYSTEM AND PROGRAM PRODUCT FOR DETERMINING A VALUE OF AN INDEX

CROSS-REFERENCE TO RELATED PATENT APPLICATIONS

This application claims priority to Provisional Application U.S. Application 61/245,882, filed Sep. 25, 2009, which application is hereby incorporated by reference in its entirety as if fully set forth herein.

BACKGROUND

The present invention relates generally to the field of economic indexes. A market index, such as a stock market index, is a method of measuring a section of a stock market. An index may be classified in a number of ways including by region, by exchange or by the size of the company. Specialized indexes exist that track the performance of a particular market or markets.

SUMMARY

It is to be understood that both the foregoing general description and the following detailed description are exemplary and explanatory only, and are not restrictive of the claimed subject matter.

According to one embodiment, a method for determining and sending or posting an electronic value for an index, comprises the steps of obtaining a set of sectors for shares in the index and obtaining a respective group of selected eligible securities for each respective sector in the set of sectors; obtaining a current float adjusted market capitalization (FAMC) for each of a plurality of the selected eligible securities; determining, by one or more computers, an FAMC percentage for each of the plurality of the selected eligible securities, by dividing the current FAMC for the respective eligible security by a total of the FAMC's of the selected eligible securities in a respective sector of the respective selected eligible security; obtaining, by the one or more computers and an electronic network connection, a respective current share price for each of the selected eligible securities; determining, by the one or more computers, a respective current FAMC factor for each of a plurality of the respective selected eligible securities, by dividing an initial sector value for a period by a value obtained by multiplying the FAMC percentage for the respective selected eligible security by a current share price for the respective selected eligible security, wherein the initial sector value for a period is the same for all of the sectors in the index and is equal to a sum of weighted share prices of the selected eligible securities of the respective sector at a given initial point in time; calculating, by the one or more computers, a respective current weighted selected eligible security value, for each of the respective selected eligible securities, by applying the current FAMC factor for the respective selected eligible security to the current share price for the respective selected eligible security; calculating, by the one or more computers, an index value by summing current weighted selected eligible securities; and posting or outputting an electronic signal comprising the index value for further electronic dissemination.

According to another embodiment, the method for determining and sending or posting an electronic value for an index, further comprises obtaining information about a corporate action in relation to one or more of the selected eligible securities that indicates that an additional eligible security must be selected in a given sector to replace one of the selected eligible securities; obtaining the additional eligible security for the given sector; calculating or obtaining, by the one or more computers, a new sector value for the given sector based on calculation of an aggregation of the weighted selected eligible securities in the given sector before the corporate action; determining, by the one or more computers, a respective current FAMC factor for the respective selected eligible securities including the additional eligible security in the given sector, by dividing the new sector value by a value obtained by multiplying the FAMC percentage for the respective eligible security by the current share price for the respective eligible security; calculating, by the one or more computers, a respective current weighted selected eligible security, for each of the respective selected eligible securities, by applying the current FAMC factor for the respective eligible security to the current share price for the respective eligible security; and calculating, by the one or more computers, the current index value by summing the current weighted selected eligible securities.

According to yet another embodiment, the information about a corporate event indicates a merger of two of the selected eligible securities to form a single entity or one of the selected eligible securities has a share price that has fallen below a threshold value.

According to still another embodiment, calculating the new sector value for the given sector comprises summing the weighted selected eligible securities in the given sector before the corporate action.

According to one embodiment, applying the current FAMC factor comprises multiplying the current FAMC factor by the current share price.

According to another embodiment, the method for determining and sending or posting an electronic value for an index, further comprises determining, by the one or more computers, a relative sector value for each of the sectors reflecting or derived from a current value determined for each of the sectors relative to a sector value of the other sectors; and posting or outputting electronically the current sector values.

According to yet another embodiment, an equal number of selected eligible securities are in each sector.

According to still another embodiment, the method for determining and sending or posting an electronic value for an index, further comprises accessing, by one or more computers, one or more electronic databases held on one or more computer-readable media, the one or more databases comprising for each of a plurality of securities, identification of a company and a plurality of characteristics for the company identified, including a current market capitalization and current float adjusted market capitalization (FAMC) for the company; selecting from the plurality of securities a plurality of eligible securities, based on one or more first criteria related to one or more of the characteristics of the respective company associated with the respective security; assigning each respective one of a plurality of the eligible securities to a respective one from a set of sectors; ranking the eligible securities, by the one or more computers, by one or more second criteria including a current market capitalization for the respective security; and for each respective sector, selecting, based at least in part on the ranking, a plurality of the eligible securities in the respective sector to comprise the group of selected eligible securities for the respective sector.

According to one embodiment, the one or more databases further comprises at least one of company financial performance information and market data.

According to another embodiment, the step of selecting a plurality of eligible securities further comprises: identifying companies offering at least one selected from the group of common stock, tracking stock, real estate investment trusts (REITs), or business development companies (BDCs); and classifying at least one of the common stock, tracking stock, real estate investment trusts (REITs), or business development companies (BDCs) of the identified companies as an eligible security.

According to still another embodiment, each respective sector in the list of sectors comprises a group of companies that share one or more common characteristics.

According to yet another embodiment, the step of assigning each of the securities to a sector further comprises: assigning each security to a sector based on at least one of a company profile, core business, product segmentation or leading revenue stream associated with the company for the security.

According to one embodiment, the step of selecting the securities based on the one or more first criteria further comprises selecting companies that are both: incorporated and domiciled in the United States of America or designated as an approved foreign entity (AFE); and have a share price of at least one U.S. dollar.

According to another embodiment, market capitalization is calculated by the share price of the security multiplied by shares outstanding.

According to still another embodiment, the float is defined as a total number of liquid shares publicly owned and available for trading, not including shares held by insiders, restricted shares, or shares held by other stagnant shareholders such as the government and employee stock ownership programs.

According to yet another embodiment, current sector values are periodically set to be substantially equal and set to an update value determined by dividing a current value of the index by the number of sectors for the index.

According to one embodiment, the amount for the index value may not be a monetary value, but rather a relative value that has significance as it relates to itself.

According to another embodiment, a method for determining and sending or posting an electronic value for an index, comprises obtaining a list of sectors; accessing, by one or more computers, one or more electronic databases held on one or more computer-readable media, the one or more databases comprising for each of a plurality of securities, identification of a company and a plurality of characteristics for the company identified, including a current market capitalization and current float adjusted market capitalization (FAMC) for the company; selecting from the plurality of securities a plurality of eligible securities, based on one or more first criteria related to one or more of the characteristics of the respective company associated with the respective security; assigning each of a plurality of the respective eligible securities to a respective one of the sectors; ranking the eligible securities, by the one or more computers, by one or more second criteria including a current market capitalization for the respective security; selecting, based at least in part on the ranking, a plurality of the eligible securities within each sector; obtaining, by the one or more computers and an electronic network connection, a respective current share price for each of the selected eligible securities; determining, by the one or more computers, an FAMC factor for each of the selected eligible securities selected based in part on the FAMC of the respective selected eligible security and the current share price for the respective selected eligible security so that, for the sector assigned to the respective eligible security, a calculation of an aggregation of weighted selected eligible securities in that sector obtained by weighting the current share price for each respective selected eligible security in that sector with its respective FAMC factor, and then summing the weighted selected eligible securities that result, is substantially equal to an aggregation of weighted selected eligible securities in any of the other of the sectors at a point in time, which aggregation is equal to an initial sector value; calculating, by the one or more computers, an amount for the index value of the selected eligible securities based on the weighted selected eligible securities; and posting the amount or outputting an electronic signal comprising the amount for the index value for further electronic dissemination.

According to still another embodiment, ranking the securities by market capitalization further comprises: comparing the market capitalization of the selected eligible securities within a same sector to obtain a ranking of securities by sector.

According to yet another embodiment, a method for administering an exchange traded fund (ETF), comprises obtaining a set of sectors for shares in the index and obtaining a respective group of selected eligible securities for each respective sector in the set of sectors; obtaining a current float adjusted market capitalization (FAMC) for each of a plurality of the selected eligible securities; determining, by one or more computers, an FAMC percentage for each of the plurality of the selected eligible securities, by dividing the current FAMC for the respective eligible security by a total of the FAMC's of the selected eligible securities in a respective sector of the respective selected eligible security; obtaining, by the one or more computers and an electronic network connection, a respective current share price for each of the selected eligible securities; determining, by the one or more computers, a respective current FAMC factor for each of a plurality of the respective selected eligible securities, by dividing an initial sector value by a value obtained by multiplying the FAMC percentage for the respective eligible security by a current share price for the respective eligible security, wherein the initial sector value is the same for all of the sectors in the index and is equal to a sum of weighted share prices of the respective group of selected eligible securities of the sector; calculating, by the one or more computers, a respective current weighted selected eligible security, for each of the respective selected eligible securities, by applying the current FAMC factor for the respective selected eligible security to the current share price for the respective selected eligible security; calculating, by the one or more computers, a current index value comprising an intra day indicative value (IIV) by summing current weighted selected eligible securities; disseminating electronically or having disseminated electronically the IIV via an electronic data communication feed and one or more computers; obtaining securities for the ETF to become a part of the portfolio of securities; performing a creation event, comprising: receiving an asset in relation to a creation event associated with a respective authorized participant (AP); issuing one or more ETF shares directly or indirectly to the respective one AP based on the asset received; and performing a redemption event, comprising: receiving one or more shares of the ETF for the same or for another of the AP's; identifying securities for the redemption event; and transferring or sending an electronic message to transfer the identified securities directly or indirectly to the respective AP or an agent thereof.

According to one embodiment, a method for determining and sending or posting an electronic value for an index, is disclosed, comprising: obtaining a set of sectors for shares in the index and obtaining a group of selected eligible securities for each of the sectors in the set of sectors including an additional selected eligible security that replaces one of the selected eligible securities in a given sector; obtaining a current float adjusted market capitalization (FAMC) for each of a plurality of selected eligible securities including the additional selected eligible security in the given sector; determining, by the one or more computers, an FAMC percentage for each of the plurality of the selected eligible securities, by dividing the current FAMC for the respective eligible security by a total of the FAMC's of the selected eligible securities in a respective sector of the respective selected eligible security; determining, by the one or more computers, a respective current FAMC factor for each of a plurality of the respective selected eligible securities in sectors other than the given sector where one of the selected eligible security had been replaced for the sector, by dividing an initial sector value for the period by a value obtained by multiplying the FAMC percentage for the respective selected eligible security by a current share price for the respective selected eligible security, wherein the initial sector value for the period was the same for all of the sectors in the index at an initial point in time; calculating, by the one or more computers, a new sector value for the given sector based on calculation of an aggregation of weighted selected eligible securities in the given sector before the selected eligible security was replaced; determining, by the one or more computers, a respective current FAMC factor for each of the respective selected eligible securities in the given sector, by dividing the new sector value by a value obtained by multiplying the FAMC percentage for the respective selected eligible security in the given sector by a current share price for the respective selected eligible security; calculating, by the one or more computers, a respective current weighted selected eligible security, for each of the respective selected eligible securities, by applying the current FAMC factor for the respective eligible security to the current share price for the respective eligible security; calculating, by the one or more computers, a current index value by obtaining an aggregation of current weighted selected eligible securities; and posting or outputting an electronic signal comprising the current index value for further electronic dissemination.

According to another embodiment, determining and sending or posting an electronic value for an index further comprises obtaining information about a corporate action in relation to one or more selected eligible securities that indicates that an additional eligible security must be selected in a given sector to replace one of the selected eligible securities for that given sector; obtaining the additional selected eligible security for the given sector; obtaining a current float adjusted market capitalization (FAMC) for each of a plurality of selected eligible securities including the additional selected eligible security.

According to a further embodiment, a system is disclosed for determining and sending or posting an electronic value for an index, comprising: one or more computers configured to perform the operations: determining, by the one or more computers, based on a set of sectors for shares in the index and a respective group of selected eligible securities for each respective sector in this set of sectors and a current float adjusted market capitalization (FAMC) for each of a plurality of the selected eligible securities, an (FAMC) percentage for each of a plurality of the selected eligible securities, by dividing the current FAMC for the respective eligible security by a total of the FAMC's of the selected eligible securities in a respective sector of the respective selected eligible security; obtaining, by the one or more computers and an electronic network connection, a respective current share price for each of the selected eligible securities; determining, by the one or more computers, a respective current FAMC factor for each of a plurality of the respective selected eligible securities, by dividing an initial sector value for a period by a value obtained by multiplying the FAMC percentage for the respective selected eligible security by a current share price for the respective selected eligible security, wherein the initial sector value for a period is the same for all of the sectors in the index and is equal to a sum of weighted share prices of the selected eligible securities of the respective sector at a given initial point in time; calculating, by the one or more computers, a respective current weighted selected eligible security value, for each of the respective selected eligible securities, by applying the current FAMC factor for the respective selected eligible security to the current share price for the respective selected eligible security; calculating, by the one or more computers, an index value by summing current weighted selected eligible securities; and posting or outputting, by the one or more computers, an electronic signal comprising the index value for further electronic dissemination.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION OF EMBODIMENTS

Embodiments of the disclosure will be described below with reference to the accompanying drawings. It should be understood that the following description is intended to describe exemplary embodiments, and not to limit the claimed subject matter.

Figure 1:
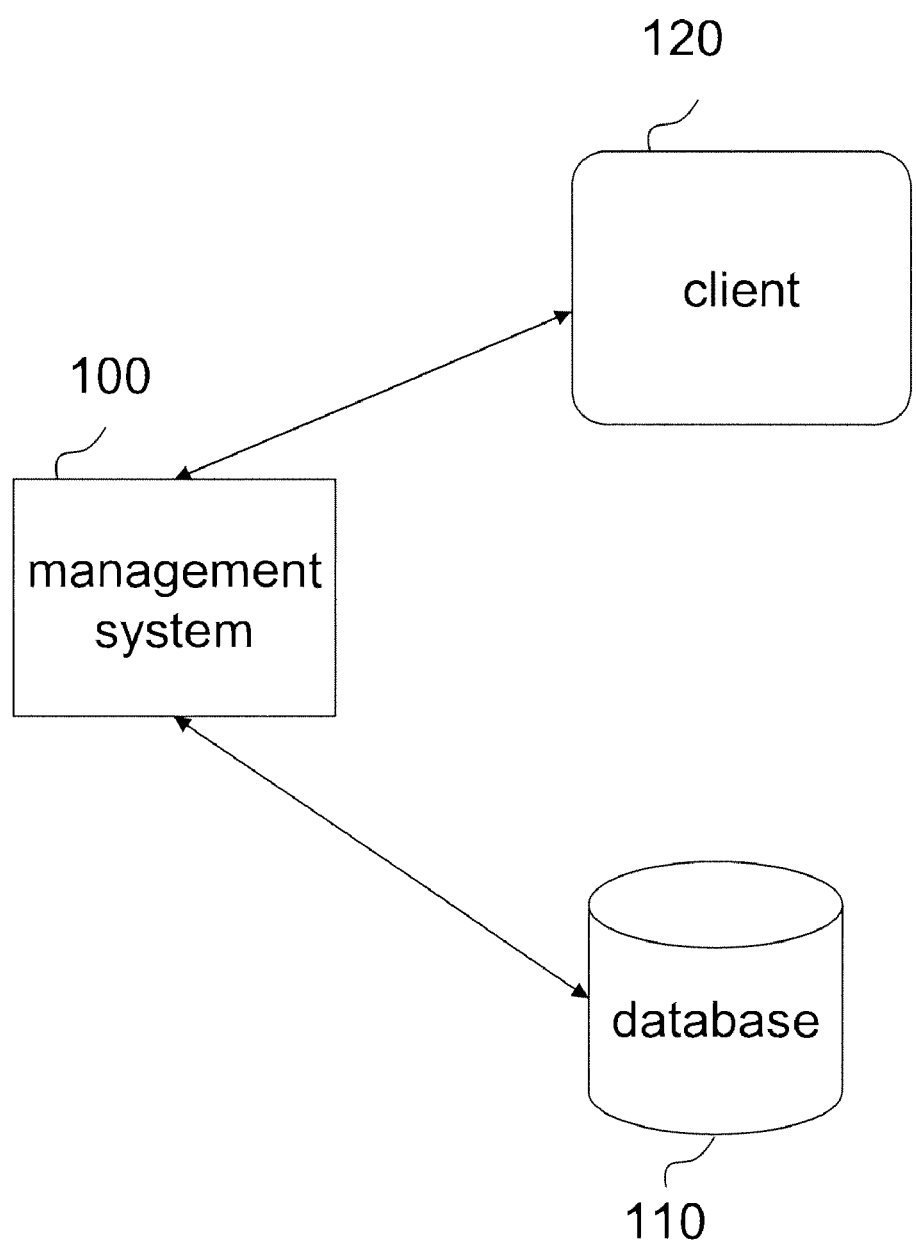
FIG. 1 is a schematic block diagram of one embodiment.

FIG. 1 is a block diagram showing an index value management system (IVMS) 100. The IVMS 100 is operably connected to a database 110. The database 110 is configured to store information. The stored information can be retrieved by the IVMS 100. In addition, the IVMS 100 may store data in the database 110. According to one embodiment, the IVMS 100 may also be connected to a client 120. The client 120 is configured to receive or obtain signals (e.g., information, data, etc.) from the IVMS 100 and provide it to a user in a perceptible format (e.g., via a display screen, audibly, in print, etc.)

Figure 2:
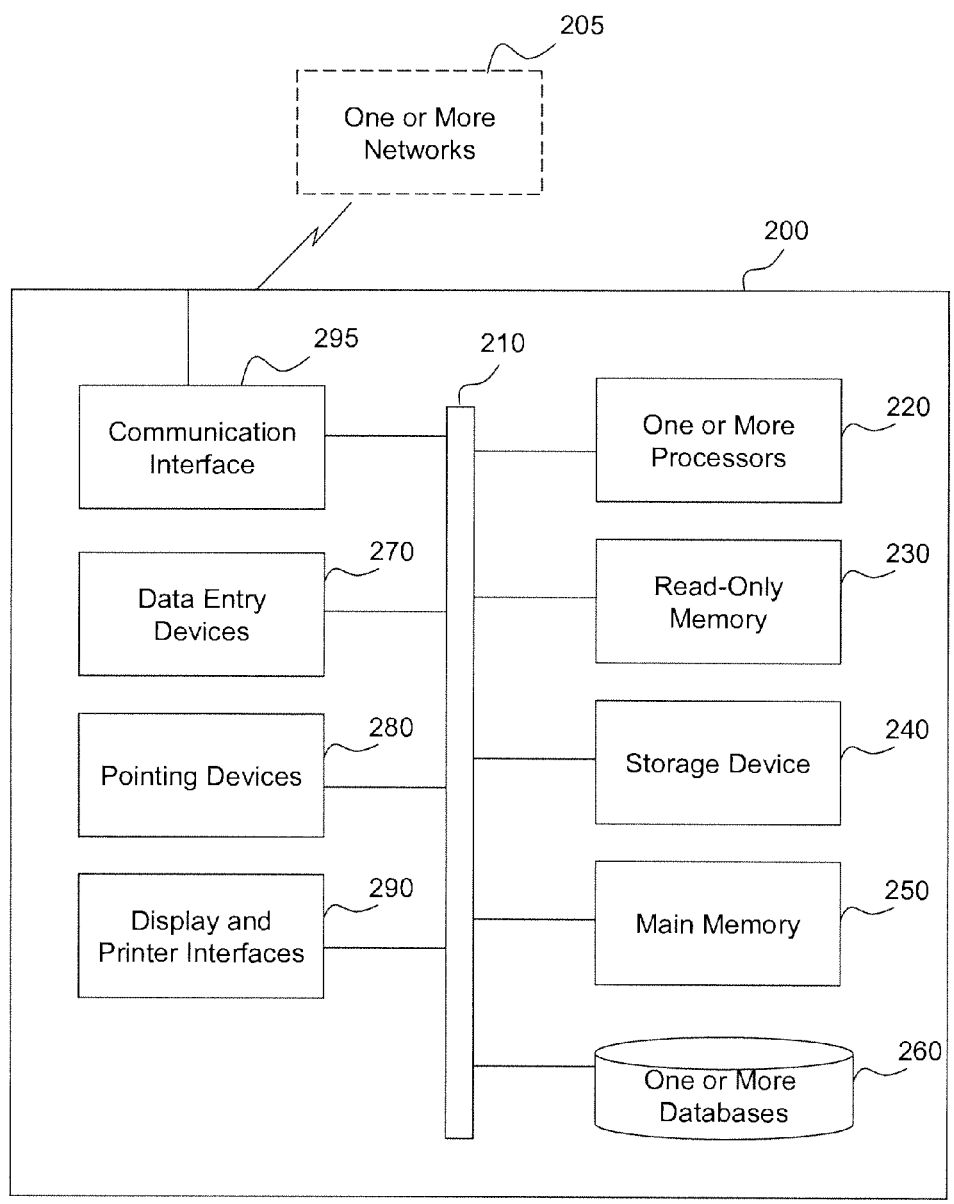
FIG. 2 is a schematic block diagram of an electronic system for implementing one or more embodiments.

FIG. 2 is a block diagram showing an embodiment of an IVMS 100 of FIG. 1, generally designated by reference number 200, according to an exemplary embodiment of the present invention. In one embodiment, the IVMS 200 according to the present invention may be communicatively coupled to one or more networks 205, such as the Internet, to communicate information therethrough to interested or authorized parties. The IVMS 200 may also or alternatively be communicatively coupled to a network 205 comprising a closed network (e.g., an intranet), and thereby communicate information to a limited amount of receivers, potentially with an enhanced level of security. The IVMS 200 may be configured to communicate, via the one or more networks 205, with other respective computer systems (e.g., database 110 or client 120).

The communication interface 295 may provide data communication through one or more networks 205 to other data devices. The network 205 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few and any combination thereof. Depending on the nature of the network employed for a particular application, the network 205 may be implemented accordingly. The network 205 serves the purpose of delivering information between connected parties.

The IVMS 200 may be used in some embodiments to implement a computing platform for providing computer-implemented operations, for example, via a server and the one or more networks 205. An exemplary IVMS 200 may operate under the control of computer-executable instructions (computer software) to carry out the process steps described herein. Computer-executable instructions comprise, for example, instructions and data which cause a general or special purpose computer system or processing device to perform a certain function or group of functions. Computer software for the IVMS 200 may comprise, in an embodiment, a set of software objects and/or program elements including computer-executable instructions collectively having the ability to execute in a single processor, or independently in a plurality of processors, a thread or logical chain of process steps, and permit the flow of data inputs/outputs therebetween.

The IVMS 200 may be implemented as, or include, one or more personal computers, workstations, notebook computers, servers, mobile computing devices, handheld devices, multi-processor systems, networked personal computers, minicomputers, mainframe computers, personal data assistants, Internet appliances (e.g., a computer designed to connect to a network, especially the Internet, etc.), or controllers.

The IVMS 200 may comprise, in one embodiment, a bus 210 or other communication component that couples the various system elements 220-295, and may be configured to communicate information between the various system elements 220-295.

As shown in FIG. 2, one or more computer processors 220 may be configured to process and handle information and execute instructions, and may be coupled with the bus 210. The management system 200 also may include a main memory 250, such as a Random Access Memory (RAM) or other dynamic storage device, coupled to the bus 210 for storing information and instructions to be executed by the one or more processors 220. The main memory 250 also may be used for storing temporary variables or other intermediate information during execution of instructions by the one or more processors 220.

The management system 200 further may include a Read-Only Memory (ROM) 230 or other static storage device (e.g., EPROM, EAROM, EEPROM, PROM, flash, and the like) coupled to the bus 210 for storing static information and instructions for the one or more processors 220. Furthermore, a storage device 240, such as a magnetic disk or optical disk, such as a CD-ROM or other optical media may be provided and coupled to the bus 210 for storing information and instructions.

In addition to the ROM 230, one or more databases 260 (represented in FIG. 1 as database 110) may be coupled to the bus 210 for storing static information and software instructions. Information stored in or maintained using the database 260 may be provided in conformance with a database management system format such as, but not limited to, the Structured Query Language (SQL) format. Database query and access instructions, for example, in the form of one or more scripts, may be used which, when executed by a processor such as the processor 220, serve to store and retrieve data maintained in the database 260 according to the instructions contained in the script, and the data fields to be accessed, as well as their arrangement.

Furthermore, the IVMS 200 may comprise application software instructions which may comprise a user interface portion for generating interactive pages or display screens by which a user may provide data to and receive information from the management system 200 and the database 260 using a human-machine interface such as a graphical user interface (GUI). Interactive pages may include user dialog boxes for accepting user entered information. In particular, the (GUI) portion may prompt the user to enter data by providing an interactive dialog box or message box instructing the user to enter particular data, or to select from among a multitude of options provided using a pull-down menu. A user may interact with the IVMS 200 via the graphical user interface provided by the GUI portion by using a pointing device and/or other data entry device. The GUI portion may place the output of the IVMS 200 in a format for presentation to a user via a display 290, discussed below. In at least one embodiment, the GUI may be implemented as a sequence of programming language instructions.

A data entry device 270, including alphanumeric and other keys, or a pointing device such as a mouse or trackball, or a scanner, to name a few, may be coupled to the bus 210 for communicating information and command selections to the processor 220. The data entry device 270 may be coupled to the bus 210 via an interface (not shown), wherein the interface may be, for example, a serial port, an RS-232 port, or the like. In addition, the interface may be a wireless interface and provide connection-less communication via, for example, Bluetooth communication.

The IVMS 200 may be coupled via the bus 210 to a display or printer 290 for outputting information to a computer user. In addition, a user may use the display (e.g., touch screen) or printer (e.g., scanner) to provide information to the management system 200. In one embodiment, the display 290 may be a Cathode Ray Tube (CRT) display, a Liquid Crystal Display (LCD), a plasma display, an LED display, a projector, or other suitable display, capable of displaying information. The printer may be a local or remote printer.

According to at least one embodiment of the present invention, the various program operations as described herein may be provided by the IVMS 200 in response to the one or more processors 220 executing one or more sequences of computer-readable instructions contained in the main memory 250. Such instructions may be read into the main memory 250 from another computer-readable medium, such as the ROM 230, the storage device 240, or the database 260. Execution of the sequences of instructions contained in the main memory 250 may cause the one or more processors 220 to perform the process steps described herein. It should be appreciated that an embodiment of the IVMS 200 may perform fewer or additional processes as compared to those described herein.

As noted, the one or more processors 220 may be arranged in a multi-processing arrangement. Alternatively, hard-wired circuitry may be used in place of or in combination with software instructions to implement the invention. Thus, embodiments of the invention are not limited to any specific combination of hardware circuitry and software.

The term "computer-readable medium" or "computer-readable storage medium," as used herein refers to any medium that is computer-readable and participates in providing instructions to the processor 220 for execution. Such a medium may be removable or non-removable and may take many forms, including, but not limited to, non-volatile media and volatile media. Non-volatile media include, for example, optical or magnetic disks, such as the storage device 240. Volatile media include dynamic memory, such as the main memory 250. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other tangible medium from which a computer can read computer instructions. Combinations of the above are also included within the scope of computer-readable media. Machine-executable instructions comprise, for example, instructions and data which cause a general purpose computer, special purpose computer, or special purpose processing machine to perform a certain function or group of functions. It should be appreciated that the one or more databases 260, the main memory 250, the storage device 240, and the ROM 230 may, in some embodiments, be described as a "computer-readable medium" or a "computer-readable storage medium."

The IVMS 200 also comprises a communication interface 295 coupled to the bus 210 and providing one-way, two-way or multi-way data communication with the network 205, or directly with other devices. For example, the communication interface 295 may comprise a modem, a transceiver, an Integrated Services Digital Network (ISDN) card, a WAN card, an Ethernet interface, or the like, to provide a data communication connection to a corresponding type of communication medium. As another example, the communication interface 295 may comprise a LAN card to provide a data communication connection to a compatible LAN. Wireless links may also be implemented. In such wireless links, communication interface 295 may communicate with a base station communicatively coupled to a network server. In any such implementation, the communication interface 295 sends and receives electrical, electromagnetic, radio, infrared, laser, or optical signals that carry digital data streams representing various types of information. Any combination of the above interfaces may also be implemented.

In one embodiment, the communication interface 295 may provide a connection through a local network to a host computer or to data equipment operated by an Internet Service Provider (ISP). The ISP may in turn provide data communication services through a worldwide packet data communication network such as the Internet. These networks use electrical, electromagnetic, or optical signals that carry digital data streams.

In one embodiment, the communication interface 295 may be communicatively coupled to a web server configured to generate and output web content that is suitable for display using a web browser at a computing device. In an embodiment, the server may generate and transmit requested information through the communication interface 295 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals, and financial entity terminals, and third party database terminals, etc., access and process data from various sources, and output computer-executable instructions and data using the network 205.

Figure 3:
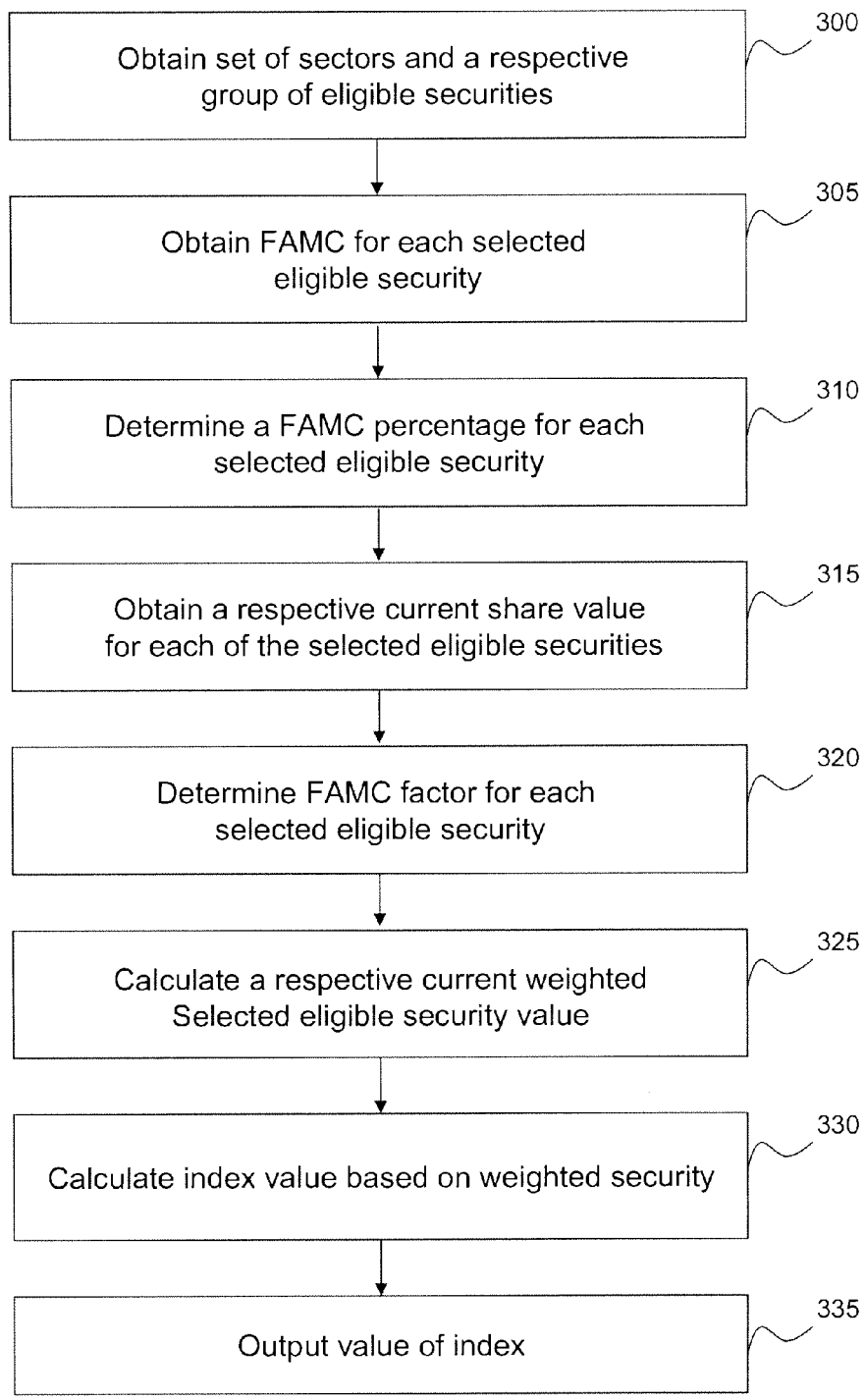
FIG. 3 is a flow chart for implementing one or more embodiments.
Figure 4:
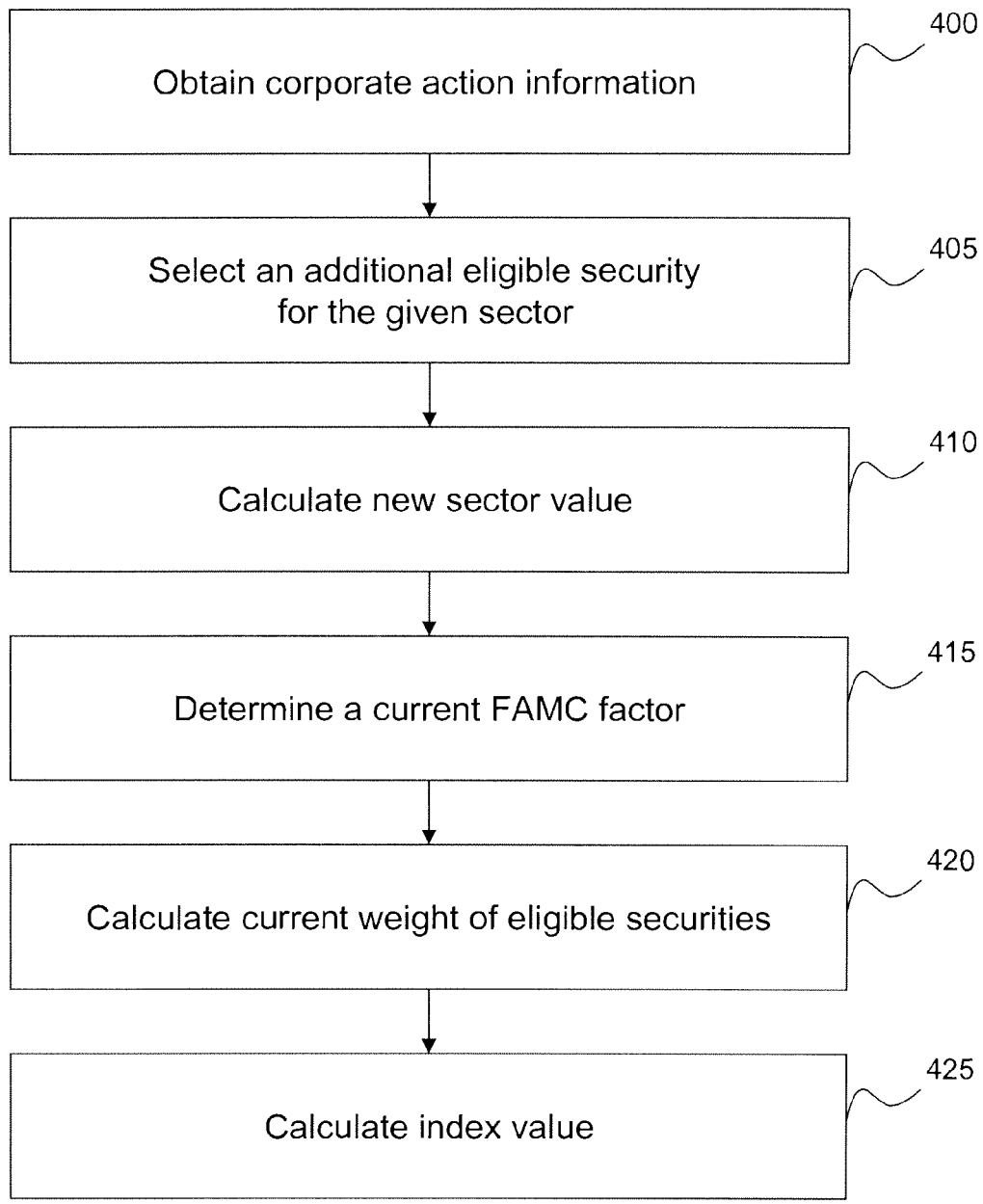
FIG. 4 is a flow chart for implementing one or more embodiments.

According to one embodiment, a method for determining and sending or posting an electronic value for an index is shown in FIGS. 3 and 4. According to one embodiment, an index value is a value calculated from set of prices or a quantity related to market performance (e.g., the stock market index). It should be understood that the specific steps described below may be performed by one or more computers and/or processors configured as described above, or in some cases manually.

According to FIG. 3, in step 300, a set of sectors for shares in the index and a respective group of selected eligible securities for each respective sector in the set of sectors is obtained. According to one embodiment, each respective sector in the list of sectors defines a group of companies that share one or more common characteristics. Table 1 shows an exemplary list of sector classifications. The list of sectors can be obtained by any means, including but not limited to, downloading, communication from a third party or may be created manually and keyed into the system, or may be created automatically by an automated sort operation based on one or more characteristics per sector. In one embodiment, a list of ten sectors is created. The example ten sectors listed below are weighted equally at inception (discussed in detail below) and are again weighted equally at a subsequent time, such as an annual reconstitution.

TABLE 1

| Sector Classification |
|---|
| Industrials and Manufacturing |
| Financials |
| Business Services |
| Consumer Services |
| Basic Materials |
| Utilities |
| Alternative Resources and Energy |
| Healthcare and Pharmaceuticals |
| Consumer Goods |
| Technology & Communication |

In the example sectors shown in Table 1, the Industrials and Manufacturing sector includes companies that manufacture non-consumer goods. The Financials sector includes investment services, banks, REITs, insurance providers and credit card issuers. The Consumer Services sector includes companies that specialize in media and entertainment, non-branded retail, travel and education. The Consumer Goods sector includes branded retail, branded products and homebuilders. Companies in the Basic Materials sector specialize in agriculture, chemicals, forest products, mineral and mining and metals. The Utilities sector includes power plants, electricity, gas and water. Companies in the Alternative Resources and Energy sector focus on renewable energy, exploration, energy services, energy equipment and energy transportation. The Healthcare and Pharmaceuticals sector includes healthcare equipment and supplies, healthcare providers, healthcare benefits and services and pharmaceutical companies. Companies in the Technology and Communications sector focus on hardware, software, telephony and internet products and services. Finally, the Business Services sector includes companies involved in the transportation of goods, marketing and advertising, consulting and outsourcing.

Figure 5:
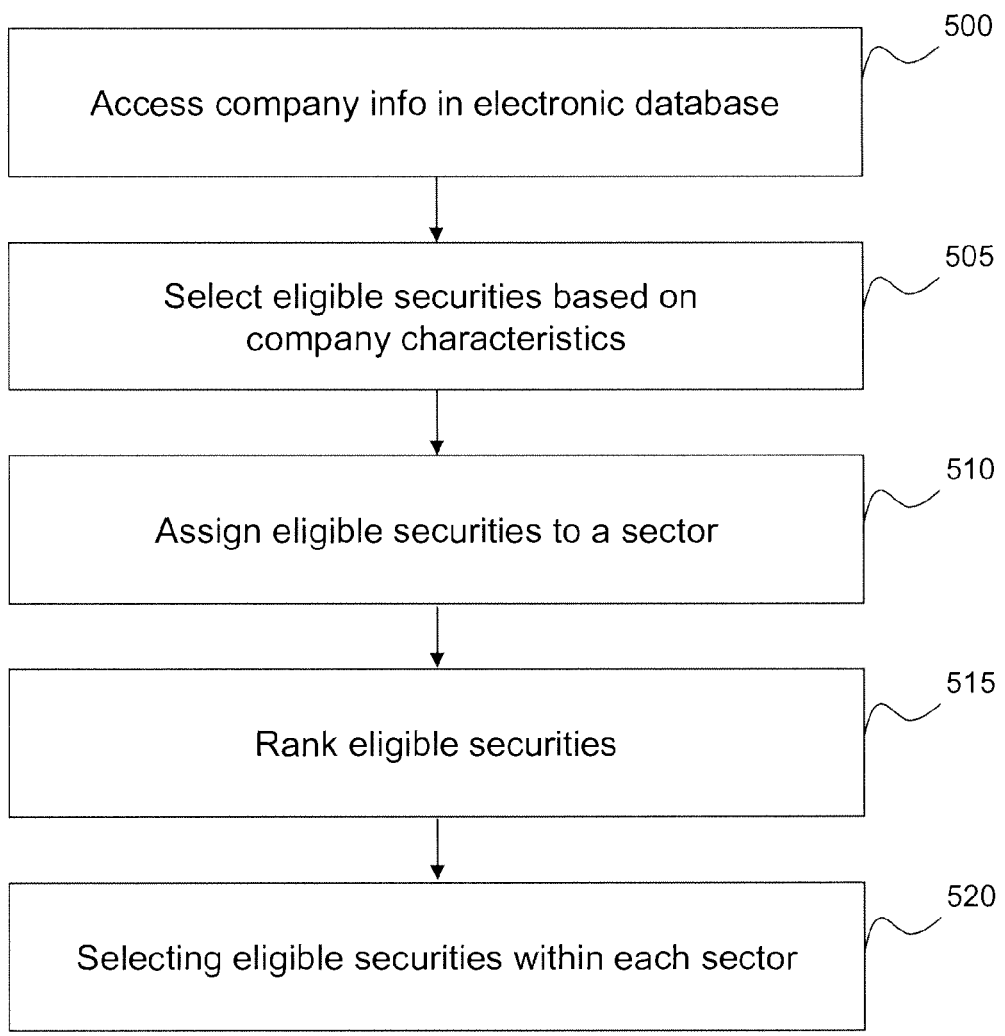
FIG. 5 is a flow chart for implementing one or more embodiments.

Selection of the eligible securities is shown in greater detail in FIG. 5. According to one embodiment, in step 500, company information for a variety of companies is obtained via access to information stored in the electronic database 110. In step 505, eligible securities for each sector are determined based on one or more characteristics of the associated company. In one embodiment, in order to determine eligible securities, companies are identified that offer at least one selected from the group of common stock, tracking stock, real estate investment trusts (REITs), or business development companies (BDCs). According to one embodiment, identified companies must be incorporated and domiciled in the United States of America or designated as an approved foreign entity (AFE); and have a share price of at least one U.S. dollar. In one embodiment, the companies use the GAAP or International Financial Reporting accounting standard for determining their financial data. Next, at least one of the common stock, tracking stock, real estate investment trusts (REITs) securities, or business development companies (BDCs) securities, of the identified companies are classified as an eligible security. According to one embodiment, companies with multiple class stock are eligible for membership, however the market capitalization for each class of stock is aggregated to ensure proper weighting.

According to one embodiment, in step 510, respective securities are assigned to a respective sector based on at least one of a company profile, core business, product segmentation or leading revenue stream (i.e., the most effective method that a company uses to earn and collect money) associated with the company for the security. This information can be obtained from, for example, the electronic database 110, the Internet or filed reports with the SEC, to name a few. In one embodiment, the Better Alternative Sector Exposure Standard (BASES) is used to help define a sector for each security. In one embodiment, an equal number of equities are assigned to each sector.

According to one embodiment, in step 515, the eligible securities are ranked. In order to rank the eligible securities, one or more criteria such as, for example, its market capitalization, is used. In one embodiment, market capitalization is calculated by multiplying a share price by a number of shares outstanding. In one embodiment, securities within the same sector are ranked relative to each other. For example, companies within the sector of Industrials and Manufacturing may have a rank of 1-390. Companies within the sector of Financials may have a rank of 1-964.

Reconstitution of the eligible securities is performed periodically, such as for example, annually. In one embodiment, securities are re-ranked by market capitalization. Securities that fall below a minimum value of market capitalization may be removed from the index at any time. In addition, a security may be removed for other reasons such as bankruptcy or an exchange delisting. According to one embodiment, removed securities are replaced as soon as possible.

In step 520, a plurality of eligible securities within each sector is selected based at least in part on the ranking. In one embodiment, an equal number of equities are assigned to each sector. According to one embodiment, the securities are assigned such that there are 100 companies represented in each of 10 sectors, thus creating a 1000 company index. According to one embodiment, only the companies ranked 1-100 in each sector become part of the index. According to one embodiment, a security will be subsequently eliminated from the index if its market capitalization falls below a ranking of 125 within its respective sector. A security with a ranking of 101 to 125 is generally retained.

Next, as shown in step 305 of FIG. 3, a current float adjusted market capitalization (FAMC) for each of a plurality of the selected eligible securities is obtained. According to one embodiment, an electronic database 110 is accessed by the management system 200 through one or more networks 205. For example, an electronic database like Bloomberg or a similar service may be accessed for data on the respective companies. The electronic database 110 stores information for a number of securities. For each security, the electronic database 110 may store company information/characteristics, financial performance information and/or market data. In addition, the electronic database 110 stores a current market capitalization and in one embodiment, a current float adjusted market capitalization (FAMC) for the security.

Float in the term "current Float adjusted market capitalization" is defined as a total number of liquid shares publicly owned and available for trading, not including shares held by insiders, restricted shares, or shares held by other stagnant shareholders such as the government and employee stock ownership programs. Market capitalization may be calculated, in one embodiment, by multiplying a current share price of the security by shares outstanding. According to one embodiment, float shares and current share price data are available and may be obtained on one or more electronic databases 110. At inception, the current share price is the inception share price.

Accordingly, the current FAMC for each of the selected eligible securities is obtained by, for example, the calculation shown in equation 1.

$$\text{Float Adjusted Market Capitalization(FAMC)} = \text{Float Shares} \times \text{Current Share price.} \qquad (1)$$

Subsequently, as shown in step 310, a computer implemented operation determines an FAMC percentage for each of the selected eligible securities, by dividing the current FAMC for the respective eligible security by a total of the FAMC's of the selected eligible securities in the respective sector of the respective selected eligible security.

$$\text{FAMC \%} = \text{FAMC} = \text{Aggregate Sum of FAMCs of selected eligible securities in the Sector.} \qquad (2)$$

In step 315, a respective current share price for each of the selected eligible securities is obtained. According to one embodiment, the share price is obtained from a third party via an electronic network connection.

In step 320, the system determines a current FAMC factor for each of the selected eligible securities, by dividing an initial sector value for a period by a value obtained by multiplying the FAMC percentage for the respective eligible security by the current share price for the respective eligible security. According to one embodiment, the initial sector value for the period is the same for all of the sectors in the index and is equal to a sum of weighted share prices of the selected eligible securities of the respective sector at a given initial point in time. The FAMC factor is calculated as follows:

$$\text{FAMC factor} = \text{Initial Sector Value} \div (\text{FAMC \%} \times \text{Current Share price)}. \qquad (3)$$

Note that the FAMC factor calculation will change for selected eligible securities in a given sector if a corporate action or event has occurred that required a replacement of one of the original selected eligible securities selected for an index inception or selected for a re-equalization for the index.

For this calculation, a current sector value for the given sector will be used instead of the initial sector value, and may be calculated, in one embodiment at a time before the corporate action.

Outstanding shares are monitored to ensure an accurate balance of the equities within each sector. Changes in the outstanding number of shares affects the current FAMC factor of a security. Generally, the number of shares of securities associated with mergers and acquisitions, stock splits and spin-offs are updated on the effective date of the transaction. According to one embodiment, the current FAMC factor for securities associated with secondary offerings, buy-backs, stock dividends, special dividends and other updates is updated periodically, e.g., weekly, monthly, etc.

In step 325, a computer implemented operation calculates the respective current weighted selected eligible security value for each of the respective eligible securities by applying the current FAMC factor for the respective eligible security to the current share price for the respective eligible security. According to one embodiment, the current FAMC factor is multiplied by the current share price to obtain the current weight of the selected eligible security.

Next, as shown in step 330, a computer implemented operation calculates an index value by summing current weighted selected eligible securities.

According to one embodiment, in step 335, an amount for the index value may be posted to a webpage maintained on a server. Note that the amount may, but need not be a monetary amount, but rather may be a relative value that has significance as it relates to itself. In another embodiment, the index value is transmitted or otherwise outputted via an electronic signal for further electronic dissemination. The eligible securities that make up each sector may also be made available as well as the sector values. Access to the website may be restricted or the information published on the website may be publicly available.

Also, a sector value may be calculated and disseminated. A sector value for a respective sector is equal to the sum of the weighted eligible securities of the respective sector. As noted, the weighting is accomplished by multiplying the respective FAMC for the respective selected eligible security in the respective sector by a current share price for the respective eligible security. At inception of the index for a given period, the sector values of the different sectors are set to be equal. In one embodiment, an initial sector value is 1000. Accordingly, for ten sectors the inception value or base value for a period of the index is 10,000. At the end of the period, e.g., a year, for example, the sector values are reset to be equal. In one embodiment, the re-set initial sector value is equal to the most recent index value divided by the number of sectors.

According to one embodiment, the system may also determine a relative sector value for each respective sector reflecting or derived from a current sector value for the respective sector relative to an overall value of the index, or relative to its initial value for that period. This relative sector value may be outputted electronically. The current sector value is calculated by aggregating the current value of the 100 securities associated with the 100 companies within a sector. The current value of the index is calculated by adding the 10 sectors together.

As noted, the system is configured to periodically obtain or calculate by computer the FAMC factor for each eligible security in order to recalculate the value of the index. Accordingly, the system can account for a case where a corporate action has taken place which causes a number of shares for the respective selected eligible security to change, thereby causing a change in the FAMC. Examples of corporate actions include, but are not limited to mergers, stock splits, stock dividends, company additions or deletions to a sector, share buybacks, IPOs and spin-offs.

Additionally, information about a corporate action (e.g., merger of two companies in the sector, or the share price of the selected eligible security falling below one U.S. dollar) may cause a requirement to replace one of the selected eligible securities.

Referring to FIG. 4, an embodiment is disclosed for calculating the index when one of the selected eligible securities in the index must be replaced. In step 400, information is obtained about a corporate action in relation to one or more of the selected eligible securities that indicates that an additional eligible security must be selected in a given sector to replace one of the selected eligible securities. Note that this information may be received over the network 205, or by mail, or by FAX, or by telephone, to name a few.

Specifically, the information about a corporate event may indicate a merger of two of the selected eligible securities to form a single entity, or that one of the selected eligible securities has a share price that has fallen below a threshold value, e.g., $1 dollar.

In step 405, an additional eligible security is selected or obtained for the given sector. This selection may be based at least in part on the ranking of the securities in the respective sector.

In block 410, a new sector value for the given sector is calculated/obtained based, in one embodiment, on a calculation comprising a summing of the weighted selected eligible securities in the given sector before the corporate action.

In step 415, the system determines a current FAMC factor for each of the selected eligible securities. The system determines a current FAMC factor for each of the selected eligible securities including the additional eligible security in the given sector, by dividing the new sector value by a value obtained by multiplying the FAMC percentage for the respective eligible security by the current share price for the respective eligible security. The FAMC percentage is calculated as set forth above.

Note that the initial sector value for the period will be used in determining the FAMC factor for the selected eligible securities in sectors where there has been no change in the make-up of the securities in the sector. Accordingly, in step 415, a computer-implemented operation is disclosed of determining, by the one or more computers, a respective current FAMC factor for each of a plurality of the respective selected eligible securities in sectors other than a given sector where a selected eligible security was replaced for the sector. In one embodiment, this FAMC factor may be calculated by dividing an initial sector value for the period by a value obtained by multiplying the FAMC percentage for the respective selected eligible security by a current share price for the respective selected eligible security, wherein the initial sector value for the period is the same for all of the sectors in the index except currently for the given sector and is equal to a sum of weighted share prices of the selected eligible securities of the respective sector at a given initial point in time.

In block 420 a computer implemented operation is disclosed of calculating the current weighted selected eligible security, for each of the respective eligible securities, by applying the current FAMC factor for the respective eligible security to the current share price for the respective eligible security. According to one embodiment, the current FAMC factor is multiplied by the current stock price to obtain the current weight of the selected eligible security.

In step 425, a computer-implemented operation is disclosed of calculating an amount for the index value based on the weighted selected eligible securities, for example, by summing the weighted selected eligible securities in the index. In one embodiment, this may be accomplished by first calculating the sector value for each of the sectors and then summing the sector values to obtain the index value.

Figure 6:
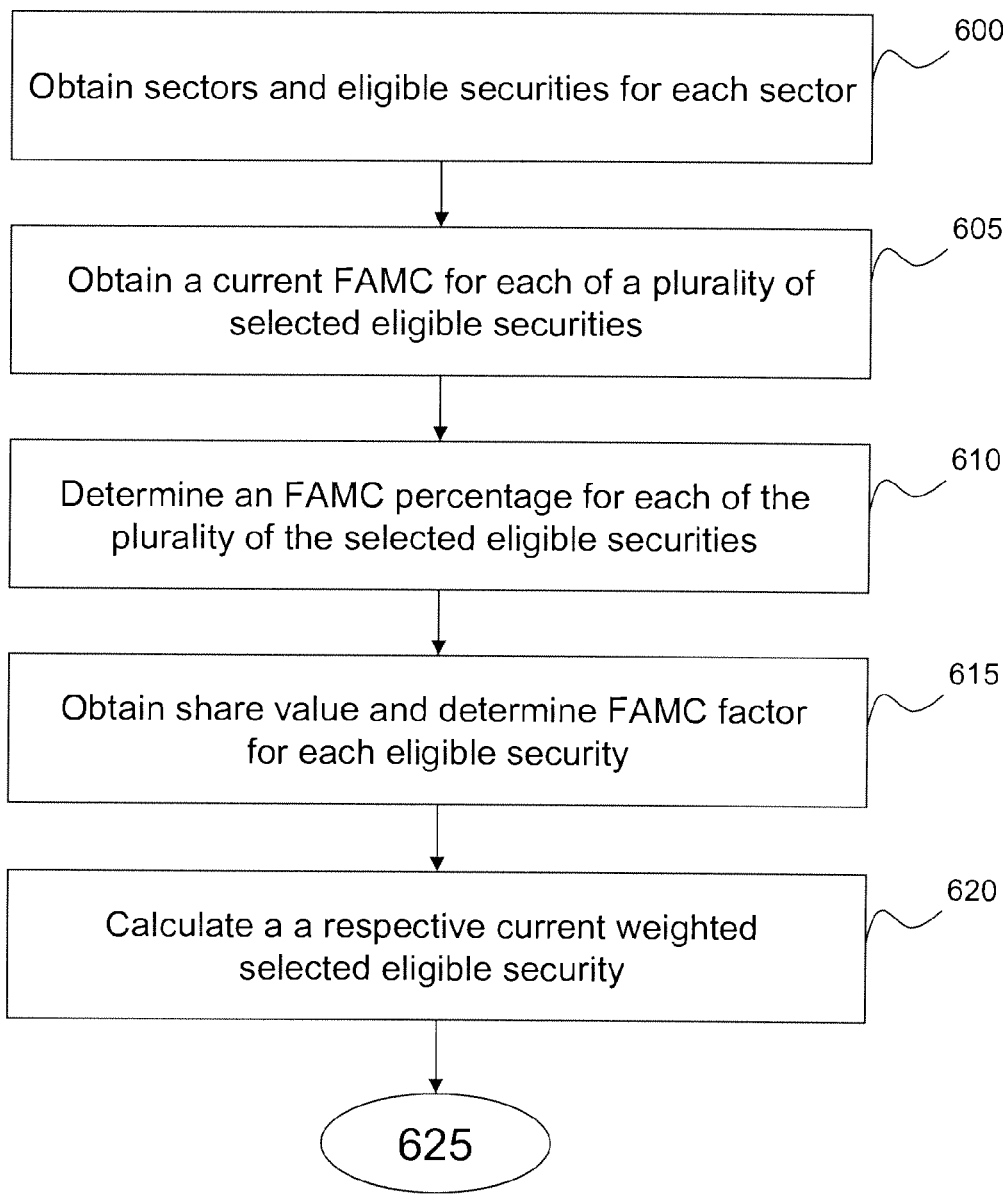
FIG. 6 is a flow chart for implementing one or more embodiments.
Figure 7:
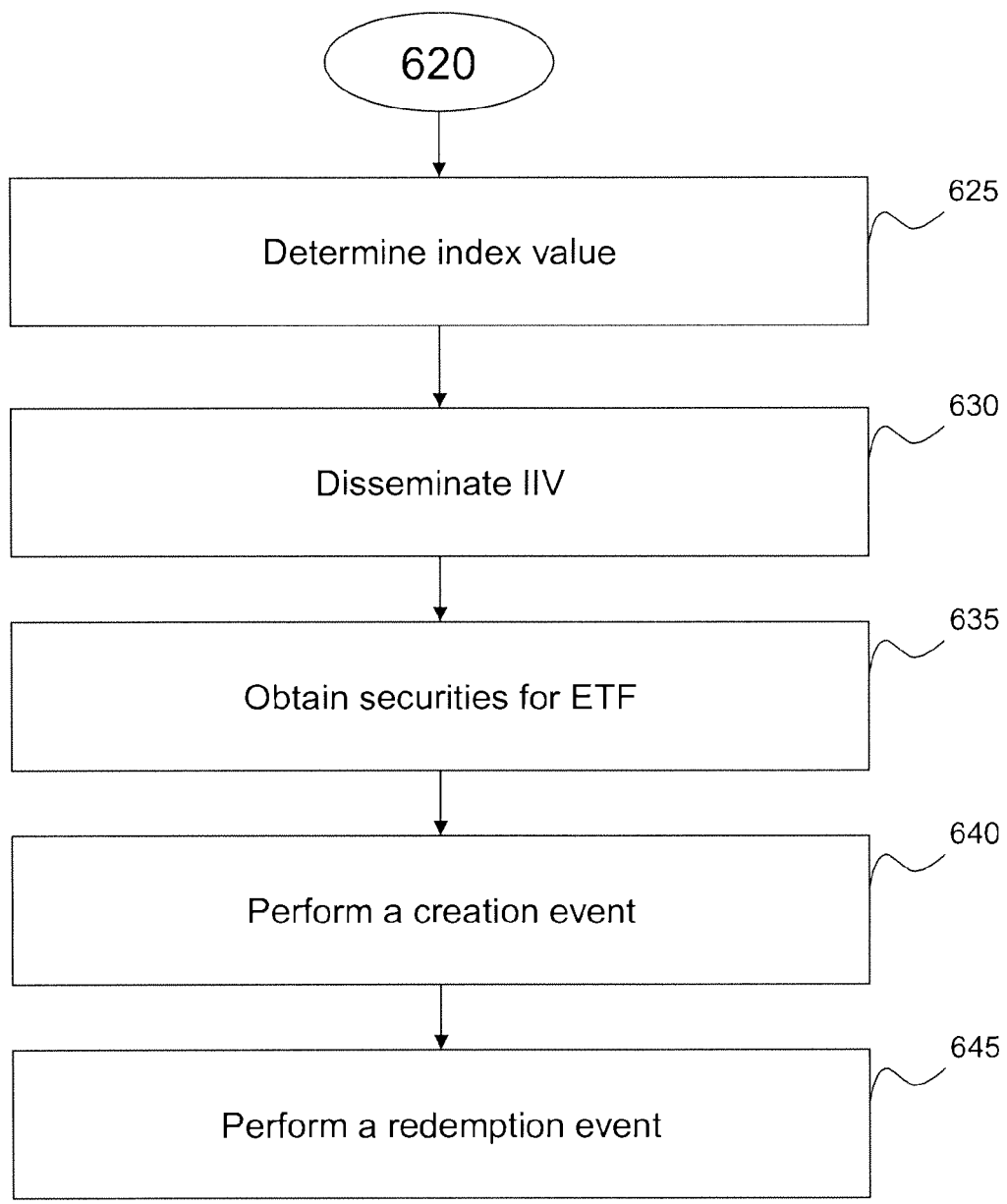
FIG. 7 is a flow chart for implementing one or more embodiments.

According to another embodiment, and as shown in FIGS. 6-7, the system administers an exchange traded fund (ETF). In step 600, the system obtains a set of sectors for shares in an index and obtains a group of selected eligible securities for each of the sectors in the set of sectors.

In step 605, the system obtains a current FAMC for each of a plurality of selected eligible securities.

In step 610, the computer-implemented operation is disclosed of calculating an FAMC percentage for each of the plurality of the selected eligible securities by dividing the current FAMC for the respective eligible security by a total of the FAMC's of the selected eligible securities in a respective sector of the respective selected eligible security.

In step 615, the system obtains a respective current share price for each of the selected eligible securities, for example, via an electronic network connection, and determines a respective FAMC factor for each of the eligible securities selected. The FAMC factor is based in part on the float adjusted market cap (FAMC) of the respective eligible security and the share price for the respective selected eligible security as discussed previously so that, for the sector assigned to the respective eligible security, a calculation of an aggregation of the FAMC factor for the selected eligible securities in that sector is substantially equal to an aggregation of the FAMC factor for the selected eligible securities in any of the other of the sectors at a point in time, which aggregation is equal to an initial sector value for the period.

In step 620, a respective current weighted selected eligible security, for each of the respective eligible securities, is calculated by applying the current FAMC factor for the respective selected eligible security to the current share price for the respective selected eligible security.

In step 625, the system obtains the current index value comprising an intra day indicative value (IIV) by summing current weighted selected eligible securities of the index.

In step 630, the IIV may be disseminated electronically.

In step 635, the system obtains securities for the ETF to become a part of the portfolio of securities.

In step 640, a creation event is performed which comprises receiving an asset in relation to a creation event associated with a respective authorized participant (AP) and issuing one or more ETF shares directly or indirectly to the respective one AP based on the asset received.

In step 645, a redemption event is performed in step 645 which comprises receiving one or more shares of the ETF for the same or for another of the AP's, identifying securities for the redemption event and transferring or sending an electronic message to transfer the identified securities directly or indirectly to the respective AP or an agent thereof.

Note that transactions involving the transfer of securities between various entities such as an ETF and an authorized participant, in one embodiment may be performed electronically via suitable messaging formats and systems well known to those of skill in the art. For example, the DTC (Depository Trust Company) provides a participant terminal system for transferring securities using electronic messaging. Thus, an electronic transfer of securities may be performed by sending an electronic message to the DTC. The DTC then performs a book entry movement by executing an accounting entry to move securities from one account to another account. Accordingly, a transfer of shares to an authorized participant (AP) in a creation event may be accomplished by sending an electronic message to the DTC with instructions to transfer the shares to the AP. Likewise, in a redemption event, securities may be transferred to the AP or his/her agent by sending an electronic message to the DTC with instructions to transfer the desired securities to the AP or his/her agent.

Figure 8:
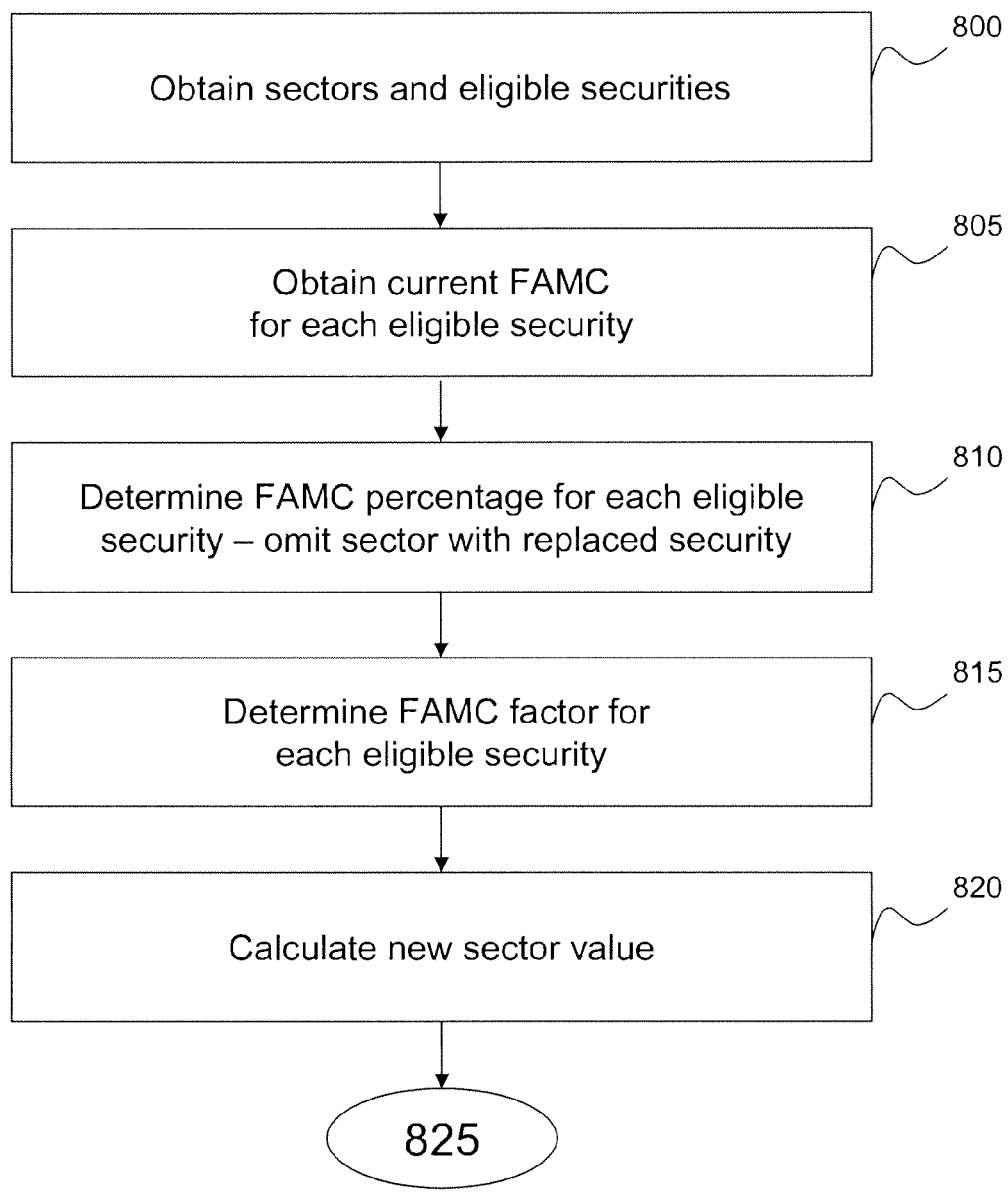
FIG. 8 is a flow chart for implementing one or more embodiments.
Figure 9:
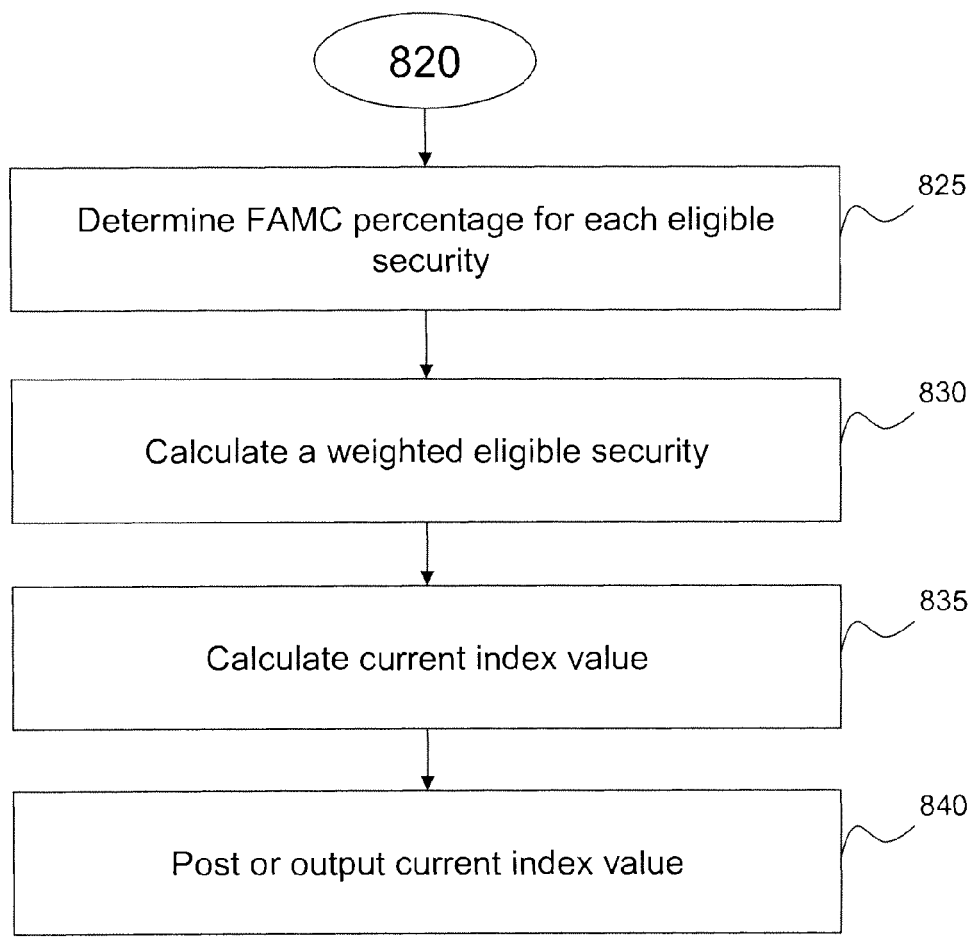
FIG. 9 is a flow chart for implementing one or more embodiments.

According to an alternative embodiment, FIGS. 8 and 9 illustrate a method for determining and sending or posting an electronic value for an index.

In step 800, the system obtains a set of sectors for shares in the index and obtains a group of selected eligible securities for each of the sectors in the set of sectors including an additional selected eligible security that replaces one of the selected eligible securities in a given sector.

In step 805, the system obtains a current float adjusted market capitalization (FAMC) for each of a plurality of selected eligible securities including the additional selected eligible security in the given sector.

In step 810, a computer implemented operation determines an FAMC percentage for each of the plurality of the selected eligible securities, by dividing the current FAMC for the respective eligible security by a total of the FAMC's of the selected eligible securities in a respective sector of the respective selected eligible security.

In step 815 a computer implemented operation determines a respective current FAMC factor for each of a plurality of the respective selected eligible securities in sectors other than the given sector where one of the selected eligible securities had been replaced for the sector, by dividing an initial sector value for the period by a value obtained by multiplying the FAMC percentage for the respective selected eligible security by a current share price for the respective selected eligible security, wherein the initial sector value for the period was the same for all of the sectors in the index at an initial point in time.

In step 820, a computer implemented operation calculates a new sector value for the given sector based on calculation of an aggregation of weighted selected eligible securities in the given sector before the selected eligible security was replaced with the additional selected eligible security.

In step 825, a computer implemented operation determines a respective current FAMC factor for each of the respective selected eligible securities in the given sector, by dividing the new sector value by a value obtained by multiplying the FAMC percentage for the respective selected eligible security in the given sector by a current share price for the respective selected eligible security.

In step 830, a computer implemented operation calculates a respective current weighted selected eligible security, for each of the respective selected eligible securities, by applying the current FAMC factor for the respective eligible security to the current share price for the respective eligible security.

In step 835, a computer implemented operation calculates a current index value by obtaining an aggregation of current weighted selected eligible securities.

In step 840, a computer implemented operation posts or outputs an electronic signal comprising the current index value for further electronic dissemination.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Embodiments of the invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice.

It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the word "plurality" means more than one, and does not refer back to any earlier use of the term, unless preceded by the word "the."

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for determining and sending or posting an electronic value for an index, comprising:
   obtaining a set of sectors for shares in the index and obtaining a respective group of selected eligible securities for each respective sector in the set of sectors;
   obtaining a current float adjusted market capitalization (FAMC) for each of a plurality of the selected eligible securities;
   determining, by one or more computers, an FAMC percentage for each of the plurality of the selected eligible securities, by dividing the current FAMC for the respective eligible security by a total of the FAMC's of the selected eligible securities in a respective sector of the respective selected eligible security;
   obtaining, by the one or more computers and an electronic network connection, a respective current share price for each of the selected eligible securities;
   determining, by the one or more computers, a respective current FAMC factor for each of a plurality of the respective selected eligible securities, by dividing an initial sector value for a period by a value obtained by multiplying the FAMC percentage for the respective selected eligible security by a current share price for the respective selected eligible security, wherein the initial sector value for a period is the same for all of the sectors in the index and is equal to a sum of weighted share prices of the selected eligible securities of the respective sector at a given initial point in time;
   calculating, by the one or more computers, a respective current weighted selected eligible security value, for each of the respective selected eligible securities, by applying the current FAMC factor for the respective selected eligible security to the current share price for the respective selected eligible security;
   calculating, by the one or more computers, an index value by summing current weighted selected eligible securities; and
   posting or outputting an electronic signal comprising the index value for further electronic dissemination.

2. The method as defined in claim 1, further comprising:
   obtaining information about a corporate action in relation to one or more of the selected eligible securities that indicates that an additional eligible security must be selected in a given sector to replace one of the selected eligible securities;
   obtaining the additional eligible security for the given sector;
   calculating or obtaining, by the one or more computers, a new sector value for the given sector based on calculation of an aggregation of the weighted selected eligible securities in the given sector before the corporate action;
   determining, by the one or more computers, a respective current FAMC factor for the respective selected eligible securities including the additional eligible security in the given sector, by dividing the new sector value by a value obtained by multiplying the FAMC percentage for the respective eligible security by the current share price for the respective eligible security;
   calculating, by the one or more computers, a respective current weighted selected eligible security, for each of the respective selected eligible securities, by applying the current FAMC factor for the respective eligible security to the current share price for the respective eligible security; and
   calculating, by the one or more computers, the current index value by summing the current weighted selected eligible securities.

3. The method as defined in claim 2, wherein the information about a corporate action indicates a merger of two of the selected eligible securities to form a single entity or one of the selected eligible securities has a share price that has fallen below a threshold value.

4. The method as defined in claim 2, wherein calculating the new sector value for the given sector comprises summing the weighted selected eligible securities in the given sector before the corporate action.

5. The method as defined in claim 1, wherein applying the current FAMC factor comprises multiplying the current FAMC factor by the current share price.

6. The method as defined in claim 1, further comprising:
determining, by the one or more computers, a relative sector value for each of the sectors reflecting or derived from a current value determined for each of the sectors relative to a sector value of the other sectors; and
posting or outputting electronically the current sector values.

7. The method as defined in claim 1, wherein an equal number of selected eligible securities are in each sector.

8. A method according to claim 1, further comprising:
accessing, by the one or more computers, one or more electronic databases held on one or more computer-readable media, the one or more databases comprising for each of a plurality of securities, identification of a company and a plurality of characteristics for the company identified, including a current market capitalization and current float adjusted market capitalization (FAMC) for the company;
selecting from the plurality of securities a plurality of eligible securities, based on one or more first criteria related to one or more of the characteristics of the respective company associated with the respective security;
assigning each respective one of a plurality of the eligible securities to a respective one from a set of sectors;
ranking the eligible securities, by the one or more computers, by one or more second criteria including a current market capitalization for the respective security; and
for each respective sector, selecting, based at least in part on the ranking, a plurality of the eligible securities in the respective sector to comprise the group of selected eligible securities for the respective sector.

9. A method according to claim 8, wherein the one or more databases further comprises at least one of company financial performance information and market data.

10. A method according to claim 8, wherein the step of selecting a plurality of eligible securities further comprises:
identifying companies offering at least one selected from the group of common stock, tracking stock, real estate investment trusts (REITs), or business development companies (BDCs); and
classifying at least one of the common stock, tracking stock, real estate investment trusts (REITs), or business development companies (BDCs) of the identified companies as an eligible security.

11. A method according to claim 8, wherein each respective sector in the list of sectors comprises a group of companies that share one or more common characteristics.

12. A method according to claim 8, wherein the step of assigning each of the securities to a sector further comprises:
assigning each security to a sector based on at least one of a company profile, core business, product segmentation or leading revenue stream associated with the company for the security.

13. A method according to claim 8, wherein the step of selecting the securities based on the one or more first criteria further comprises selecting companies that are both:
incorporated and domiciled in the United States of America or designated as an approved foreign entity (AFE); and
have a share price of at least one U.S. dollar.

14. A method according to claim 1, wherein market capitalization is calculated by the share price of the security multiplied by shares outstanding.

15. A method according to claim 1, wherein float is defined as a total number of liquid shares publicly owned and available for trading, not including shares held by insiders, restricted shares, or shares held by other stagnant shareholders such as the government and employee stock ownership programs.

16. A method according to claim 1, wherein current sector values are periodically set to be equal and set to an update value determined by dividing a current value of the index by the number of sectors for the index.

17. A method according to claim 1, wherein the amount for the index value is not a monetary value, but rather a relative value that has significance as it relates to itself.

* * * * *